United States Patent [19]
Fujishige

[11] 3,813,154
[45] May 28, 1974

[54] STILL AND SLOW MOTION CONTROL UNIT FOR A PROJECTOR

[76] Inventor: Sadao Fujishige, Chino, Japan

[22] Filed: Aug. 6, 1973

[21] Appl. No.: 386,161

[30] Foreign Application Priority Data
Aug. 7, 1972 Japan................................ 47-92732

[52] U.S. Cl.................... 352/169, 226/66, 352/137, 352/180, 352/194
[51] Int. Cl. .......................................... G03b 21/38
[58] Field of Search ........... 352/137, 169, 180, 194; 226/66

[56] References Cited
UNITED STATES PATENTS
3,592,373   7/1971   Kim ...................................... 226/66

*Primary Examiner*—Monroe H. Hayes
*Attorney, Agent, or Firm*—McGlew and Tuttle

[57] ABSTRACT

A control unit for a projector is provided which permits a single control member to be moved to each of normal projection position, still projection position and slow motion projection position by a manual operation which takes place externally of the projector. When the control member is moved to a still projection position, a first rockable arm is actuated to retract a film feed pawl to disable film transport. When the control member is moved to the slow motion projection position, the first rockable arm is held in its operative position while a slow motion cam interlocked with the shutter shaft is operated to actuate the first rockable arm intermittently through a second rockable arm to thereby drive the film feed pawl.

6 Claims, 5 Drawing Figures

FIG. I

STILL AND SLOW MOTION CONTROL UNIT FOR A PROJECTOR

BACKGROUND OF INVENTION

The invention relates to a still and slow motion control unit for a projector, in particular for a small projector.

It is possible to add a lot of fun to movie projection if a projector, in particular, a small projector, can be constructed to permit a still and slow motion projection to be achieved through the operation of a single operating member. At this end, a still projection can be achieved by disabling the transport of a film being projected to bring the film to a stop and by interposing a perforated filter in the path of the projecting light. However, for a slow motion projection, an arrangement must be adopted such that a film taken at high speed is projected at a normal projection speed. Thus, the slow motion projection depends on the speed with which pictures are taken with a camera. Nevertheless, a simulated slow motion projection can be provided if a film taken at a normal taking speed is transported and projected at a reduced speed compared with the normal projection speed, for example, at one-half or one third the normal projection speed. In this manner, the three positions of still, normal and slow motion projections can be achieved by a manipulation of the projector alone.

SUMMARY OF INVENTION

It is an object of the invention to provide a still and slow motion control unit for a projector which permits a selective performance of a simulated slow motion projection, still projection and normal projection through a suitable motion of a single operating member.

In accordance with the invention, there is provided a projector capable of providing, in addition to normal projection, a still projection and a slow motion projection by merely moving a single control member from outside the projector. The mechanism involved is extremely simple, requires a reduced number of parts and provides the advantage of being easily incorporated into a projector. In addition, it is constructed mechanically rigid, and thus is free from likelihood of failure for a prolonged period of use.

Figure 1:
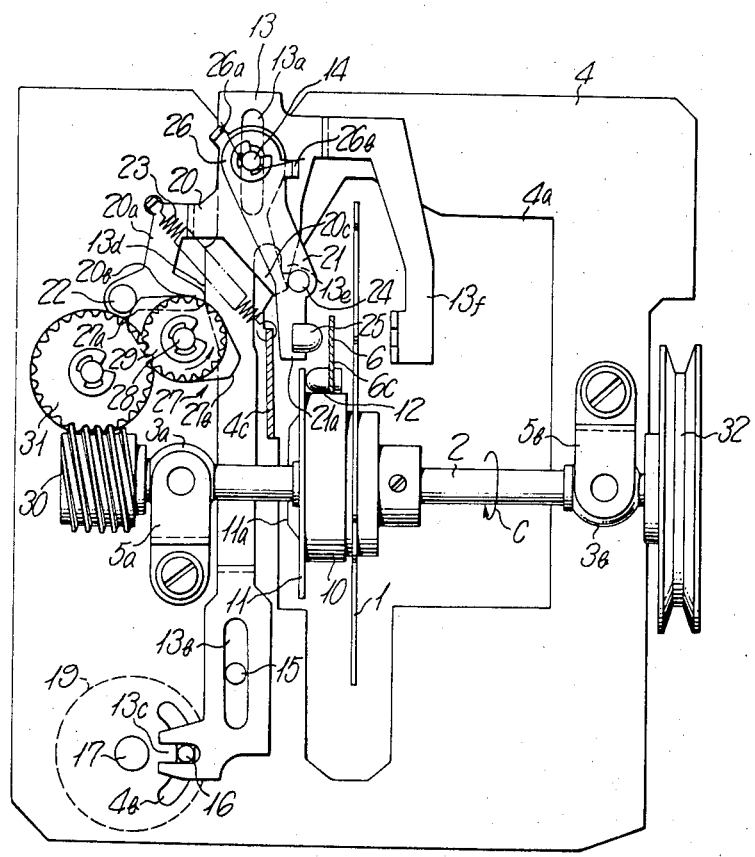
FIG. 1 is an elevational view of a still and slow motion control unit for a small projector constructed in accordance with one embodiment of the invention.

DESCRIPTION OF A PREFERRED EMBODIMENT OF INVENTION:

A shutter disc 1 in a conventional projector comprises blades 1a, 1b, 1c which extend radially outwardly at equiangularly spaced positions, and has its center of rotation located at a shutter shaft 2 which is driven by a synchronous motor, not shown. The shutter shaft 2 is rotatably mounted in bearings 3a, 3b which are attached to a base plate 4 by means of fixtures 5a, 5b, the base plate extending vertically through the center of the projector. The base plate 4 is formed with an opening 4a in which the shutter disc 1 fixedly mounted on the shutter shaft 2 is located. Thus, substantially one-half of the shutter disc 1 extends through the opening 4a to the opposite side from the side on which the shutter shaft 2 is located. On this opposite side to which the shutter disc 1 extends, there is formed a path of projecting light which comprises a projection lamp, an aperture, projection lens and the like, all of which are not shown. The path of projecting light extends parallel to the shutter shaft 2, and a film F to be projected is adapted to be fed vertically into the path, which path is intermittently interrupted by the three blades 1a to 1c when the shutter shaft 2 is rotating. Two, 1a and 1c, of the three blades 1a to 1c are provided for the purpose of preventing a flicker effect as is well known, and when the remaining blade 1b interruptes the path of projecting light, the film F is transported by a distance corresponding to one frame by a feed pawl 6a which is arranged to undergo a vertical and lateral motion. The feed pawl 6a is formed on the forward end of a feed member 6 which extends through the opening 4a and which is located forwardly of the shutter disc 1. The base 6b of the feed member 6 is loosely supported at a pivot 7 by a stationary member (not shown), and its free end is pulled downwardly by a spring 8 and also forwardly (to the left, as viewed in FIG. 2) by a spring 9. Thus, the feed pawl 6a formed on the forward end is capable of being driven forwardly into a perforation Fa in the film F, and of moving it downward for the purpose of transporting the film F by a distance corresponding to one frame. As is well known, the motion of the feed pawl 6a which transports the film F for the distance of one frame is under the control of the above-mentioned springs 8, 9 as well as an eccentric cam 10 and a face cam 11, both securedly mounted on the shutter shaft 2.

Specifically, the eccentric cam 10 is fixedly mounted on the shutter shaft 2 forwardly of and adjacent to the shutter disc 1 that is fixedly mounted thereon, and the face cam 11 integral with the eccentric cam 10 is also fixedly mounted thereon at a position forwardly of the eccentric cam 10. The face cam 11 is in the form of a disc which is partly formed with a forwardly bulging cam surface 11a. The feed member 6 extends transversely above the eccentric cam 10, and has formed at its lower edge a depending portion 6c which extends toward the eccentric cam 10 and which carries a pin 12 mounted thereon. As a result of the resilience of the spring 8 which pulls the feed member 6 downward, the peripheral surface of the pin 12 abuts against the peripheral surface of the eccentric cam 10, and as a result of the resilience of the spring 9 which pulls the feed member 6 forwardly, the forward end face of the pin 12 abuts against the active surface of the face cam 11. As a consequence, as the shutter shaft 2 makes one revolution, the pin 12 follows the active cam surface 11a of the face cam 11 to cause the feed pawl 6a to move forwardly into a perforation Fa in the film F. Subsequently, the pin 12 follows a gradually decreasing diameter of the active cam surface of the eccentric cam 10 to cause the feed pawl 6a to move downward for a downward transport of the film by a distance corresponding to one frame. When one frame has been transported, the pin 12 is forced rearwardly out of the active cam surface 11a of the face cam 11, and because the eccentric cam 10 now has an increasing diameter, the feed pawl 6a returns to its upper position. The above describes the motion of the feed pawl 6a under the control of the cams and springs, and represents a conventional transport means for the film F in a normal projection operation.

Figure 2:
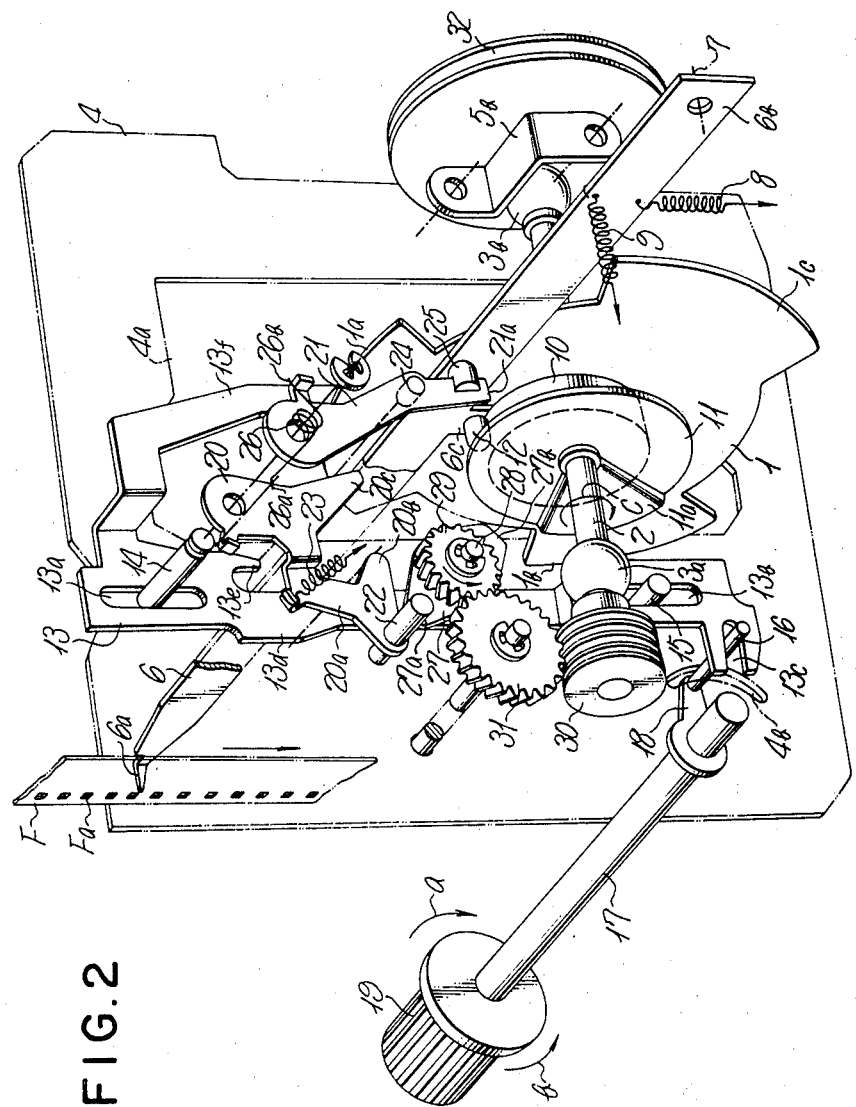
FIG. 2 is an exploded, perspective view of FIG. 1.

The control unit according to the invention is incorporated into the film feed mechanism thus constructed. As shown in FIGS. 1 and 2, there is provided forwardly (to the left as viewed in the Figure) of the shutter disc 1 a control member 13 which moves to change between a normal projection position, a still projection position and a slow motion projection position in response to a manual operation from outside the projector. The control member 13 is formed by a vertically movable slide plate having a pair of elongate guide slots 13a, 13b at its upper and lower portions, respectively, into which slots are fitted pins 14, 15 secured to the base plate 4, thus positioning the slide plate in overlapping relationship with the base plate 4. A fork 13c is formed on the left-hand edge of the lower portion of the control member 13, and fitted into the fork 13c is a pin 16 which extends through an arcuate groove 4b formed in the base plate 4 and extends to the opposite side thereof for connection with a projection 18 having its base fixedly mounted on an operating shaft 17. The operating shaft 17 is rotatably mounted in the base plate 4 and has its axial end extending to the exterior of the projector and provided with an operating knob 19 secured thereon. When the knob 19 is turned in the direction indicated by an arrow a to rotate the operating shaft 17 clockwise about its axis, the projection 18 also rotates clockwise, thereby rotating the pin 16 clockwise within the arcuate groove 4b. As the pin 16 rotates, the control member 13 is moved downward through the fork 13c. When the control member 13 has moved downward, the projector assumes a still projection position. Conversely, when the knob 19 is turned in the direction of an arrow b, the projection 18 is rotated counter-clockwise about the operating shaft 17 and the pin 16 is also rotated counterclockwise within the arcuate groove 4b. As the pin 16 rotates in this manner, the control member 13 is moved upwardly through the fork 13c. When the control member 13 has moved upward, the projector assumes a slow motion projection position.

Toward the upper portion, the control member 13 is formed on its left-hand edge (as viewed in FIGS. 1 and 2) with a protruding edge 13d which is operative to place a second rockable arm 20 to be described later in its operative position. The protruding edge 13d is adapted to be disengaged from the second rockable arm 20 when the control member 13 has moved upward. On the opposite side from the protruding edge 13d, or on the right-hand edge as viewed in FIGS. 1 and 2, the control member 13 is formed with an inclined protrusion 13e which is adapted to urge a first rockable arm 21 to be described later when the control member 13 has moved downward. At its upper end, the control member 13 extends rearwardly and then is folded at right angles to its plane and then folded at right angles thereto for the second time to extend rearwardly and then downwardly along an oblique path to form an arm 13f. The arm 13f serves to interpose a perforated filter (not shown) into the path of projecting light when the control member 13 has moved downward to assume a still projection position, and to interpose a heat-shield filter (not shown) into the path of projecting light when the control member 13 has moved upward to assume a slow motion projection position.

The second rockable arm 20 is disposed in overlapping relationship with the control member 13. The second rockable arm 20 is pivotally mounted on the pin 14 and has an arm portion 20a which extends forwardly and downwardly along an oblique path, as viewed in FIGS. 1 and 2 and carrying a pin 22 fixedly mounted in its forward end. The pin 22 is adapted to move along the active peripheral surface of a slow motion cam to be described later for rocking the second rockable arm 20 about the pivot pin 14 when the control member 13 is in its upper position or slow motion projection position. Another arm portion 20b extends from the arm portion 20a for engagement with the protruding edge 13d. A coiled spring 23 extends between the arm portion 20a of the second rockable arm 20 and an upstanding member 4c (see FIG. 1) on the base plate 4 for urging the second rockable arm 20 to rotate counterclockwise about the pivot pin 14. However, such rotation is normally prevented by the engagement of the arm portion 20b with the protruding edge 13 d. The second rockable arm 20 is also formed with a third arm portion 20c which extends to the right and downwardly (as viewed in FIGS. 1 and 2) and which is adapted to urge a pin 24 to be described later, when the arm 20 has rocked counter-clockwise about the pivot pin 14, to rock the first rockable arm 21 counter-clockwise about the pivot pin 14. The first rockable arm 21 is disposed in overlapping relationship with the second rockable arm 20, and is also pivotally mounted on the pin 14. The second rockable arm 20 has its free end 21a extending toward the feed member 6 at a position forwardly thereof or to the left thereof as viewed in FIGS. 1 and 2. A pusher 25 is mounted on the free end 21a and is adapted to abut against the feed member 6 at suitable times to move it rearwardly against the resilience of the spring 9, thereby moving the pin 12 thereon away from the face cam 11. Preferably, the pusher 25 and the pin 12 are made of a shock-absorbing material such as synthetic resin or the like.

On the other hand, a pin 24 is mounted on the middle portion of the first rockable arm 21 on the side nearer the base plate 4, and is adapted to be urged by the movement of the third arm portion 20c or the inclined protrusion 13e to rock the first rockable arm 21 counter-clockwise about the pivot pin 14. The first and second rockable arms 21 and 20 thus constructed are coupled together by a torsion spring 26. One end 26a of the torsion spring 26 wound around the pivot pin 14 is anchored to the second rockable arm 20 for causing it to rotate counter-clockwise about the pivot pin 14, while the other end 26b of the spring 26 is anchored to the first rockable arm 21 for causing it to rotate clockwise about the pivot pin 14. However, the rotation of the second rockable arm 20 is prevented by the abutment of the arm portion 20b against the protruding edge 13d, and the rotation of the first rockable arm 21 is prevented by the engagement of the pin 24 with the arm portion 20c. The resilience of the spring 26 is chosen such that the force exerted thereby is less than the bias applied by the coiled spring 23.

A slow motion cam 27 is located adjacent to the pin 22, this cam 27 being pivotally mounted on a pivot 28 that is fixedly mounted on the base plate 4. The cam 27 has a circular circumference and a pair of active surfaces 27a, 27b which comprise diametrically opposite, radially projecting portions of the circumference and which are adapted to move the pin 22. The cam 27 is driven for rotation about the pivot 28 by a drive gear 29 which is integrally mounted therewith and which meshes with a reduction worm gear 31 which in turn meshes with a worm 30 that is fixedly mounted on the shutter shaft 2. Thus the drive gear 29 is rotated through a reduction gearing comprising the worm 30 and the worm gear 31 with a selected speed reduction with respect to the rotational speed of the shutter shaft 2, for example, by a factor of six in the present example. Consequently, as the shutter shaft 2 makes three revolutions, the drive gear 29 undergoes one-half revolution, thereby causing one of the active surfaces on the cam 27 to push up the pin 22.

The operation of the control unit according to the invention will be described more fully below.

NORMAL PROJECTION POSITION

In this instance, the control member 13 is moved neither upwardly nor downwardly, but remains in its neutral position so that none of the first and second rockable arms 20 and 21 operate. Consequently, when the shutter shaft 2 is rotated in the direction of an arrow $c$ by a synchronous motor, not shown, through pulley 32, the feed member 6 undergoes a lateral and vertical motion, that is, forth and back as well as down and up, by its pin 12 abutting against both the face cam 11 and the eccentric cam 10, whereby the feed pawl 6a engages with and disengages from a perforation Fa in the film F for an intermittent transport of the film F at a given speed. At this time, both the drive gear 29 and the slow motion cam 21 also rotate counterclockwise, but the cam 28 remains idling because the arm portion 20b engages with the protruding edge 13d to constrain the movement of the pin 22.

STILL PROJECTION POSITION

Figure 3:
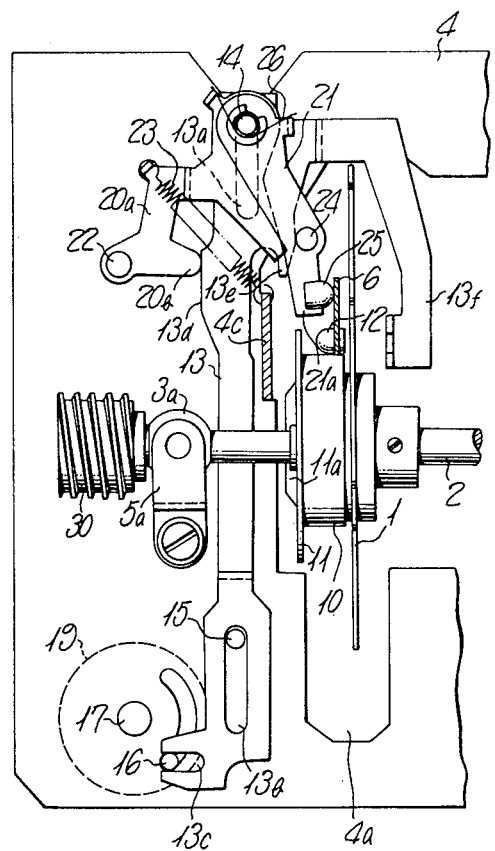
FIG. 3 is a similar view to FIG. 1, illustrating the unit in its still projection position.

In this instance, the operating knob 19 is turned in the direction of the arrow $a$ (see FIG. 2) to move the control member 13 downward. As the control member 13 moves downward, the inclined protrusion 13e urges the pin 24 to rock the first rockable arm 21 counter-clockwise about the pivot pin 14 against the resilience of the spring 16, as shown in FIG. 3. Thereupon the pusher 25 secured to the free end 21a of the arm 21 moves the feed member 6 to the right, as viewed in FIG. 3, against the resilience of the spring 9. When the feed member 6 is thus moved, the pin 12 is moved away from the face cam 11, whereby it is no longer influenced by this cam as it rotates. However, the pin 12 remaines in abutment against the eccentric cam 10 and therefore undergoes only a vertical motion even though the lateral motion of the feed pawl 6a is disabled. As a result, the film F remains still for the purpose of still projection rather than being transported. When the control member 13 moves downward, its arm portion 13f causes a perforated filter, not shown, to be inserted into the path of projecting light, thereby preventing a burning of the stationary film by the heat from the projector light source.

In this manner, with a still projection, the first rockable arm 21 rocks by interlocking with the movement of the control member 13 to urge the feed member 6 back so as to keep the film feed pawl 6a retracted from the film surface, thereby disabling film transport and permitting a still projection.

At this time, the second rockable arm 20 remains in its inoperative position. Specifically, when the control member 13 moves downward, the arm portion 20b remains in engagement with the protruding edge 13d, so that the second rockable arm 20 cannot be released from its constraint and the slow motion cam 27 remains idling.

SLOW MOTION PROJECTION

Figure 4:
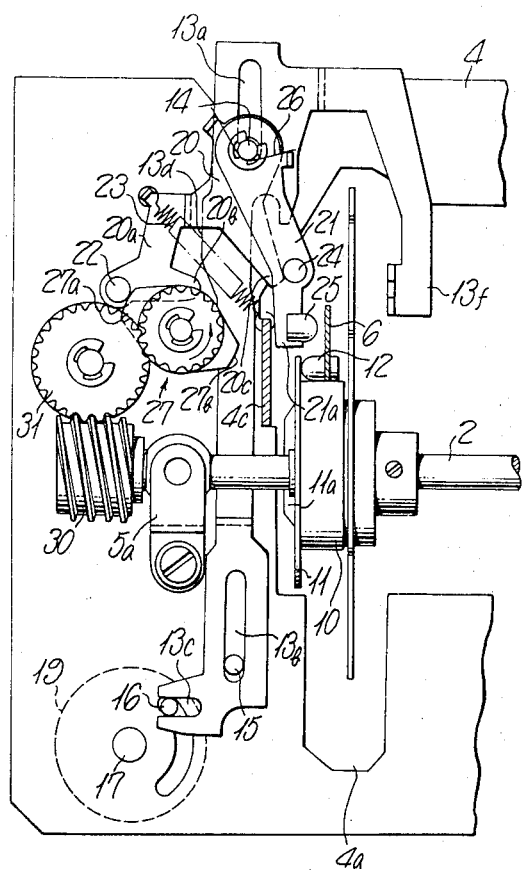
FIGS. 4 and 5 are similar views to FIG. 1, illustrating the unit in its slow motion projection position.
Figure 5:
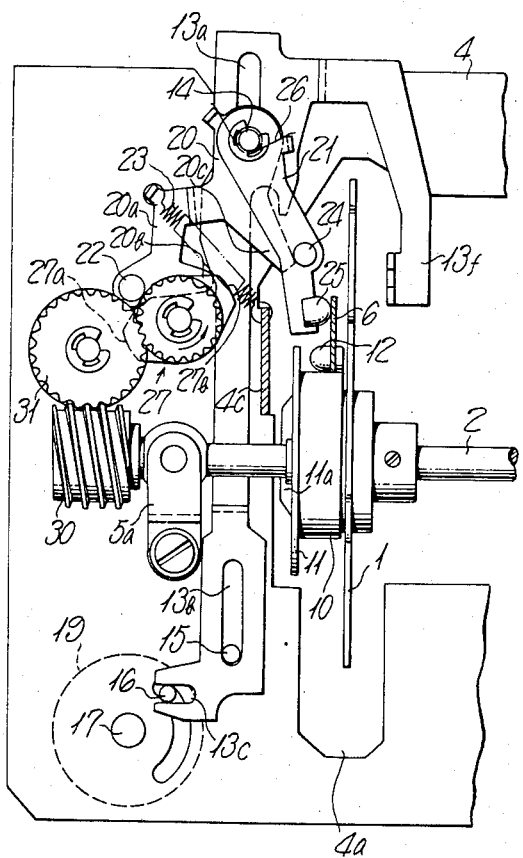

In this instance, the operating knob 19 is turned in the direction of the arrow $b$ (see FIG. 2) to move the control member 13 upward. As the control member 13 moves upward, the protruding edge 13d moves also upward as shown in FIG. 4, whereby the arm portion 20b is disengaged from the protruding edge 13d to release the second rockable arm 20 from its constraint. When the second rockable arm 20 is released, the pin 22 is permitted to move in following relationship with the active peripheral surface of the slow motion cam 27. Specifically, when the projecting active periphery 27a or 27b of the slow motion cam 27 pushes up the pin 22, the second rockable arm 20 is rocked clockwise about its pivot pin 14, and when the pin 22 falls in the peripheral portion between the projecting active edges 27a and 27b, the second rockable arm 20 rocks counter-clockwise about its pivot pin 14. It follows that as the slow motion cam 27 makes one-half revolution, the second rockable arm 20 experiences one reciprocatory rocking motion about its pivot pin 14. When the pin 22 is being pushed up by the projecting active edge 27a of the slow motion cam 27 as shown in FIG. 4, the second rockable arm 20 rocks clockwise about its pivot pin 14 against the resilience of the spring 23, so that the first rockable arm 21 is permitted to rock clockwise about the pivot pin 14 under the action of the spring 26 until the pin 24 abuts against the arm portion 20c. During the clockwise rocking motion of the first rockable arm 21, the pusher 25 attached to the free end 21a of this arm also moves clockwise away from the feed member 6, so that the pin 12 follows the movement of the face cam 11 and the eccentric cam 10, whereby during one revolution of the shutter shaft 2, the feed pawl 6a (see FIG. 2) undergoes both lateral and vertical motion to feed the film F by a distance corresponding to one frame. When the shutter shaft 2 has completed its one revolution, the slow motion cam 27 has moved through an angle corresponding to one-sixth revolution, whereupon the pin 22 slides down from the projecting active edge 27a onto a peripheral edge between the projecting active edges 27a and 27b, thereby causing the second rockable arm 20 to rock counter-clockwise about the pivot pin 14 under the action of the spring 23. As the second arm rocks, the arm portion 20c urges the pin 24 angularly, as shown in FIG. 5, whereby the pusher 25 moves the feed member 6 rearwardly or to the right as viewed in FIG. 5. Thereupon the pin 12 is moved away from the face cam 11, so that the feed pawl 6a effects only a vertical motion, thus disabling the transport of the film F. This condition is maintained while the shutter 1 completes two revolutions. During such period, the film F thus remains stationary. After the shutter shaft 2 has completed two revolutions and the slow motion cam 27 has completed two-sixth revolution, the projecting active edge 27b pushes up the pin 22 during the continued rotation, whereby the second rockable arm 20 rocks clockwise about the pivot pin 14 against the resilience of the spring 23. As this occurs, its arm portion 20c also rocks clockwise, so that the first rockable arm 21 follows such rocking motion under the action of the spring 26 to rock clockwise about the pivot pin 14. As a consequence, the pusher 25 moves away from the feed member 6 to return to the position shown in FIG. 4. Thereafter the pin 12 abuts against the face cam 11 again, so that as the shutter shaft 2 rotates, the feed pawl 6a undergoes both lateral and vertical motion to transport the film F by one frame. In this manner, the feed pawl 6a operates intermittently during three revolutions of the shutter shaft 2 to feed the film F by one frame, thus allowing a simulated slow motion projection.

During the slow motion projection, the upward motion of the control member 13 causes its arm portion 13f to insert a heat-shield filter, not shown, into the path of projecting light.

In the embodiment described above, while the operating knob 19 is turned to move the control member 13 vertically, such movement of the control member 13 may be alternatively achieved by providing a portion thereof which extends to the exterior of the projector for direct operation thereof. Thus the means for moving the control member 13 is not limited to a particular means illustrated in the embodiment. While the slow motion cam 27 has been described to be driven at a reduction ratio of one-sixth, it should be understood that any reduction ratio can be used in connection with a suitable number of projecting active edges provided.

What is claimed is:

1. A still and slow motion control unit for a projector comprising a film feed pawl adapted to undergo a vertical and lateral motion by a combination of cam means and spring means, a control member movable to each of normal projection position, still projection position and slow motion projection position in response to an external operation, a first rockable arm operable, when the control member is moved to the still projection position, to be urged by the movement of the control member to maintain the film feed pawl retracted from the film to thereby disable film transport, and a second rockable arm operable, when the control member is moved to the slow motion projection position, to locate the first rockable arm in its operative position by interlocking with the control member and to cooperate with a slow motion cam that is interlocked with a shutter shaft to operate the first rockable arm intermittently to thereby drive the film feed pawl.

2. A still and slow motion control unit according to claim 1 in which the control member is formed by a vertically movable slide plate that is adapted to be operated from the exterior of the projector.

3. A still and slow motion control unit according to claim 1 in which the control member is formed with a protruding edge which constrains the rocking motion of the second rockable arm.

4. A still and slow motion control unit according to claim 1 in which the first rockable arm is rocked by an inclined protrusion formed on the control member as the latter moves, the rocking motion of the first rockable arm being effective to move the film feed pawl away from a cam that drives the pawl for its lateral motion.

5. A still and slow motion control unit according to claim 1 in which the slow motion cam is driven from the shutter shaft through a reduction gearing to cause a rocking motion of the second rockable arm.

6. A still and slow motion control unit according to claim 5 in which the reduction gearing comprises a worm fixedly mounted on the shutter shaft, a worm gear meshing with the worm, and a drive gear meshing with the worm gear and driving the slow motion cam for rotation.

* * * * *

UNITED STATES PATENT OFFICE
CERTIFICATE OF CORRECTION

Patent No. 3,813,154        Dated May 28, 1974

Inventor(s) Sadao Fujishige

It is certified that error appears in the above-identified patent and that said Letters Patent are hereby corrected as shown below:

On the cover sheet insert:

-- [73] Assignee: Sankyo Kogaku Kogyo Kabushiki Kaisha --.

Signed and sealed this 28th day of January 1975.

(SEAL)
Attest:

McCOY M. GIBSON JR.
Attesting Officer

C. MARSHALL DANN
Commissioner of Patents